(12) United States Patent
Chin et al.

(10) Patent No.: US 6,653,619 B2
(45) Date of Patent: Nov. 25, 2003

(54) OPTICAL MOTION ENCODER WITH A REFLECTIVE MEMBER ALLOWING THE LIGHT SOURCE AND SENSOR TO BE ON THE SAME SIDE

(75) Inventors: Yee Loong Chin, Perak (MY); Kok Hing Fo, Butterworth (MY); Hoo Chong Wong, Perak (MY); Eric James Barton, Pleasanton, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 161 days.

(21) Appl. No.: 09/953,781

(22) Filed: Sep. 12, 2001

(65) Prior Publication Data

US 2002/0038848 A1 Apr. 4, 2002

(30) Foreign Application Priority Data

Sep. 15, 2000 (MY) ..................................... PI 20004283

(51) Int. Cl.[7] .................................................. G01D 5/34
(52) U.S. Cl. .................. 250/231.13; 356/617
(58) Field of Search ................ 250/231.13–231.18, 250/237 R, 237 G; 356/616–622

(56) References Cited

U.S. PATENT DOCUMENTS

| | | | | |
|---|---|---|---|---|
| 3,875,406 A | * | 4/1975 | Holeman | 250/231.13 |
| 4,259,570 A | | 3/1981 | Leonard | 250/214 A |
| 4,266,125 A | | 5/1981 | Epstein et al. | 250/231 SE |
| 4,654,525 A | | 3/1987 | Ebina et al. | 250/231 SE |
| 4,691,101 A | | 9/1987 | Leonard | 250/231 SE |
| 4,952,799 A | | 8/1990 | Loewen | 250/231.16 |
| 5,148,020 A | | 9/1992 | Machida | 250/231.16 |
| 5,241,172 A | | 8/1993 | Lugaresi | 250/231.16 |
| 5,274,229 A | | 12/1993 | Khan | 250/231.18 |
| 5,317,149 A | | 5/1994 | Uebbing et al. | 250/231.14 |

* cited by examiner

Primary Examiner—Thanh X. Luu

(57) ABSTRACT

An optical motion encoder for translation of movement information into a digital output. The optical encoder includes an optical member having a parabolic reflecting surface and a planar surface with a code pattern printed thereon. The light rays received by the parabolic reflecting surface from a light source positioned on the axis of symmetry of the parabolic reflecting surface are reflected as parallel light rays through the planar surface to be modulated by the code pattern and detected by a light detector. In this way, both, the collimator and the code wheel or code strip of prior art optical encoders are represented by a single optical member.

13 Claims, 1 Drawing Sheet

OPTICAL MOTION ENCODER WITH A REFLECTIVE MEMBER ALLOWING THE LIGHT SOURCE AND SENSOR TO BE ON THE SAME SIDE

FIELD OF INVENTION

This invention generally relates to optical motion encoders, such as a shaft encoder or a strip encoder. In particular, the present invention improves and simplifies the structural design of optical motion encoders for translation of movement information such as the direction and increment of rotational or translational movement of an object into output signals indicative of the movement.

BACKGROUND OF THE INVENTION

Prior art optical motion encoders of the present kind translate rotary or linear motion information into a digital output.

Exemplary rotary and linear optical motion encoders are known from U.S. Pat. No. 4,691,101. The rotary encoder, also known as a shaft angle encoder, includes a light source for emitting a light beam, an encoder wheel for modulating the light beam in response to shaft rotation, and a detector assembly for receiving the modulated light and producing electrical signals indicating the amount of light received by the detectors.

As the light is modulated in response to shaft rotation, each electrical signal from the detector assembly produces a wave form. The position of the shaft determines the position of each signal on its particular wave form, that is, the phase of each signal. Thus, the electrical signals from the detectors can be used to indicate shaft rotation. Two or more properly out-of-phase signals, from separate detectors, can be used to indicate both direction and magnitude of rotation.

Typical shaft angle encoders have an opaque wheel with a plurality of transparent windows through which illumination passes. In the simplest embodiment, a light source is provided adjacent to one face of the wheel. A photodetector is placed on the opposite side of the wheel so that as the wheel rotates, light from the emitter is alternately passed through a window to the photodetector or occulted by an opaque area of the wheel. In a linear motion optical encoder, the encoder wheel is replaced by a encoder strip which is provided with transmissive and non-transmissive areas for modulating light from an emitter.

There may be a number of drawbacks to such arrangements, particularly when relatively low-cost encoders are desired. These drawbacks stem from having the light emitter on one side of the wheel/strip and the light detectors on the opposite side of the wheel/strip. This means that there are two substrates to which electrical connections must be made. Having two substrates complicates the positioning and alignment of components to obtain a desired precision. Each of these results in difficulties in the assembling process which in turn adds significantly to the cost of the encoder.

Further, to obtain precision and high contrast, it is commonly necessary to employ collimating optics for the light source. This adds an element of complexity and difficulty in assembly alignment and also enlarges the size of the encoder. In the modern world, it is almost universal that small size is desirable.

It is, therefore, desirable to produce an optical encoder where the light emitters and photodetectors can be mounted on a single substrate.

U.S. Pat. No. 4,952,799, discloses a reflective shaft angle encoder in which the light emitters and photodetectors are mounted on a single substrate. This is achieved by employing an optical shaft angle encoder having a code wheel with alternating reflective and non-reflective areas in a circumferential path on one face of the wheel. A light emitting diode is spaced apart from the reflective areas on the wheel. As the wheel rotates, images of the reflective and non-reflective areas are projected to the photodetectors which in turn generate signals indicative of the motion of the wheel.

However, reflective optical encoder arrangements of the type disclosed in U.S. Pat. No. 4,952,799 are very sensitive to the relative positions of the code wheel and the photodetectors. The image of reflective and non-reflective areas projected to the photodetectors varies greatly with the orientation of the code wheel and the distance the code wheel is spaced apart from the photodetectors. Consequently, having a reflective code wheel complicates the positioning and alignment of the encoder components which adds significant cost to the encoder. Furthermore, precision and high contrast are also compromised by the lack of light source collimation in the reflective optical encoder arrangements.

It is an object of the present invention to provide an optical motion encoder that has a simplified design to simplify the assembling process and to at least reduce sensitivity for misalignment of the optical components used.

Another object of the present invention is to provide an optical motion encoder that allows for flexibility in designing absolute and incremental light encoding pattern with various resolution.

It is a further object of the present invention to provide an optical motion encoder of the present kind that allows in a simple way to include a visual output of the light source.

SUMMARY OF THE INVENTION

An optical motion encoder for translation of movement information into a digital output that embodies the principles of the present invention includes the integration of a collimating reflector surface and a code patterned planar surface into a single optical member. The optical member moves with respect to a reference axis and has reflecting surface for reflecting light rays received from a point light source on the reference axis in a direction which is substantially parallel with the reference axis. Preferably, the reflecting surface is an parabolic surface symmetrical about the reference axis.

The optical member further includes a planar surface which is perpendicular to the reference axis for receiving the parallel light rays reflected from the reflector surface and is provided with a code pattern for modulating the light rays passing through the planar surface when the optical member is moving. The modulated light is detected by a light sensor arrangement which is preferably aligned in parallel with the reference axis and the modulated light rays. The light sensor is configured to detect light signals in a desired way to provide an output signal indicative of the motion of the optical member. The output signal is preferably a digital output signal with one or more channels.

In a preferable embodiment of the present invention, the optical motion encoder is designed as an optical shaft encoder processing a rotational movement around the reference axis, wherein the reflecting surface is a parabolic concave surface of an axially symmetric paraboloid of revolution having the reference axis as its axis of symmetry.

In a further preferred embodiment, the optical member is extended at the apex of the reflecting surface by a translucent shaft extending along the reference axis. Such a shaft, which is aligned with the light source, serves in this way as visual output of the light source for visual feedback. If the motion encoder according to the invention is a shaft encoder, said translucent shaft acts as a light pipe and can also be used as the shaft of the shaft encoder for mounting the encoder to the rotating object the rotary movement of which should be detected.

Due to the structural design of the motion decoder of the invention, the reflector and the encoding component can be assembled in a simple way thereby realizing the one-part optical member of the invention. The optical member can even be constructed as a translucent body of optical glass or plastics in the shape of a half of a paraboloid having its parabolic surface coated with a reflective coating to form the reflecting surface and having the code pattern printed or etched on its planar base surface.

DESCRIPTION OF THE PREFERRED EMBODIMENT

Figure 1:
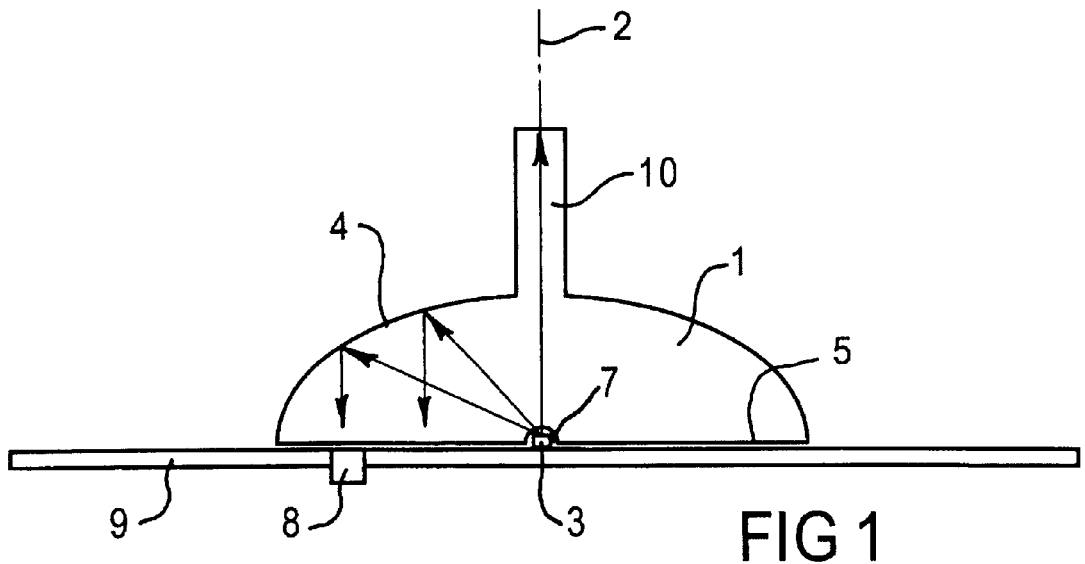
FIG. 1 is a schematic sectional view of an optical shaft encoder according to the present invention.
Figure 2:
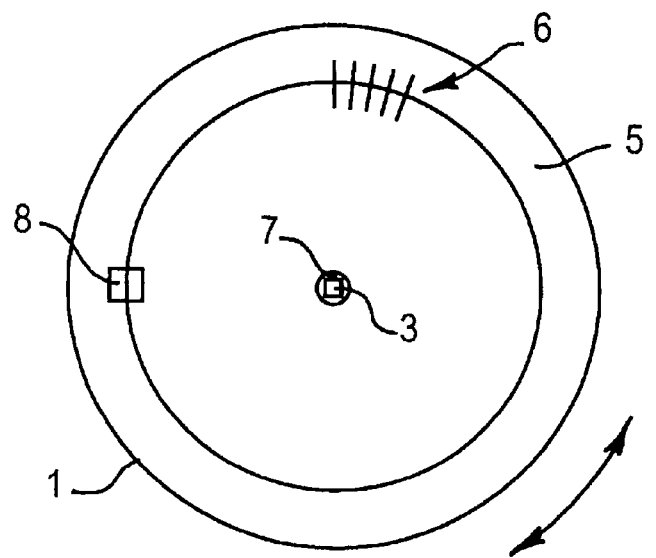
FIG. 2 is a schematic top view of the optical shaft encoder of FIG. 1.

A preferred embodiment of an optical motion encoder embodying the principles of the present invention is shown in the drawings in the form of a shaft encoder. The shaft encoder comprises an optical member 1 which is mounted in an axially cantilevered manner to allow rotation about an axis 2. The optical member has the shape of a half of an axially symmetric paraboloid having a parabolic reflecting surface 4 formed by a reflective coating on the parabolic outer surface of the optical member 1, and having a planar surface 5 being perpendicular to the axis 2 as the base surface of the paraboloid. A code pattern of a desired shape and pattern in a circular row around axis 2 is applied to the planar surface 5 of optical member 1 by printing or etching or the like. Preferably, the code pattern comprises a plurality of alternating optically transmissive and non-transmissive areas.

A stationary point light source 3 is positioned in the focal point of the parabolic reflecting surface 4 on axis 2. A stationary light sensor 8 spaced from the planar surface 5 by a gap is located at the radial position of the code pattern and directed in parallel with the axis 2 to the reflecting surface 4. The point light source 5, which is a light emitting diode (LED), and the light sensor 8, constructed as a plurality of photodiodes, are integrated in a printed circuit board 9 further including an integrated detector circuit of a desired design. Alternatively, the light sensor 8 may comprise just a single photodiode.

During continuous or incremental rotation of the optical member 1 around axis 2, the light rays which are emitted by the point light source 7 are reflected by the parabolic reflecting surface 4 toward the planar surface 5 in a direction which is parallel to the axis 2 and are modulated by the code pattern 6 on the planar surface 5. The light rays are modulated by the alternating optically transmissive and non-transmissive areas of the code pattern. Modulated light rays passing through the code pattern are detected by light sensor 8 and are further processed by the detector circuit to receive a one- or more-channel output signal which is indicative of the rotary movement of the optical member 1.

At the apex of the parabolic reflecting surface 4 on the axis 2 of rotation, the optical member is extended by a light shaft 10 receiving that light output of the point light source that does not hit the parabolic reflecting surface 4 thereby acting as a light pipe for a visual output of the light source 5.

The optical member 1 of the encoder according to the present invention is preferably a single optical plastic part with the integrated reflector surface 4 realized by an reflective coating and the integrated code pattern 6 which is applied by printing or etching or the like to the planar surface 5. The light emitter 3 may be surrounded by a hemispherical light entrance surface 7 being spaced from the light source 3 by a small gap and having its center point on the focal point of the parabolic surface 4, which also includes the point light source 3, to minimize refraction as the light from the light source 3 enters the optical member 1. Further, a shield (not shown) may be designed in to block direct light transmission from point light source 3 to light sensor 8.

Evidently, a plurality of concentric circles of code patterns can be present on planar surface 5 to cooperate with several light sensors for receiving a desired motion information from the rotating optical member 1.

An advantage of an optical motion encoder according to the invention are the one-piece-integrated collimator (reflecting surface 4) and code wheel (planar surface 5 with code pattern 6 thereon), by which the assembly process is simplified without extended adjustment work. Another advantage of an optical motion encoder according to the invention is that the code pattern 6 can be positioned adjacent the light sensor 8 thus improving the accuracy and resolution capability of the encoder, in particular relative to prior art reflective code wheel encoders.

The one-piece integration of the collimator and the code wheel allows for flexibility in designing absolute and incremental light encoding patterns with various resolutions. Having the light shaft 10 allows creation of a visual light output through the central shaft of rotation for visual feedback.

Various modifications are possible to be made in the scope of the invention as claimed. For instance, though the preferred embodiment shown and described is intended to be a shaft encoder, the invention could even be realized in so-called strip encoders for translation of translational movement information of an object carrying out a linear movement in a direction which is perpendicular to axis 2. In such an embodiment, the optical member can be designed as an axially symmetric parabolic cylinder having its cylinder axis running through the focal line of the parabolic-cylindrical reflecting surface 4, a strip code pattern in parallel with the cylinder axis on the planar base surface 5 and a single point light source or a plurality of point light sources on the cylinder axis cooperating with one or more light sensors 8 in respective positions along the planar surface 5. Light shaft 10 may have the shape of a light plate for giving a visual output of the light source or of the plurality of light sources. Lateral radiation along the cylinder axis may be shielded or separated by other measures as desired.

What is claimed is:

1. An optical motion encoder for translation of movement information into an electrical signal, comprising:
    a light source;
    an optical member moveable relative to the light source, the optical member comprising a modulating code pattern surface having a plurality of alternating light transmissive and non-transmissive areas, and a reflecting surface above the modulating code pattern surface to reflect light rays received from the light source towards the modulating code pattern surface; and a light sensor located on the same side of the light source and being responsive to reflected light rays passing through the modulating code pattern surface for generating an output signal indicative of movement of the optical member.

2. An optical motion encoder as claimed in claim 1, wherein the optical member is rotationally moveable about a reference axis.

3. An optical motion encoder as claimed in claim 2, wherein the light source is a point light source positioned proximate the reference axis.

4. An optical motion encoder as claimed in claim 2, wherein the reflective surface is rotationally symmetrical about the reference axis.

5. An optical motion encoder as claimed in claim 4, wherein the reflective surface is a parabolic surface positioned to reflect light rays from the light source in a direction substantially parallel with the reference axis.

6. An optical motion encoder as claimed in claim 3, wherein the light source is surrounded by a spaced hemispherical light entrance surface of the optical member.

7. An optical motion encoder as claimed in claim 2, wherein the optical member includes a light shaft extending through the reflecting surface along the reference axis.

8. An optical motion encoder as claimed in claim 1, wherein the optical member is a light translucent body having a parabolic first outer surface which is coated to realize the reflecting surface and having a planar second outer surface opposite to the first surface which is coated to realize the modulating code pattern surface.

9. An optical motion encoder for translation of movement information into a digital output, the optical encoder comprising:

an optical member for movement with respect to a reference axis, a light source on said reference axis, an axially symmetric parabolic reflecting surface on the optical member for reflecting light rays received from the light source in a direction which is parallel with said reference axis, a planar surface on the optical member perpendicular to said reference axis for receiving parallel light rays reflected from the reflecting surface, a code pattern on the planar surface for modulating reflected light rays received by and passing through the planar surface of the optical member when the optical member is moving, and a light sensor for detecting the modulated reflected light rays and providing a digital output signal which is indicative of the movement of the optical member.

10. An optical motion encoder as claimed in claim 9, wherein the movement of the optical member is a rotational movement around said reference axis and the parabolic reflecting surface is a paraboloid of revolution surface having said reference axis as its symmetry axis.

11. An optical motion encoder as claimed in claim 10, wherein the light source is surrounded by a spaced hemispherical light entrance surface of the optical member.

12. An optical motion encoder as claimed in claim 9, wherein the optical member includes a light shaft extending through the reflecting surface along the reference axis.

13. An optical motion encoder as claimed in claim 9, wherein the optical member is a light translucent body having a parabolic first outer surface which is coated to realize the parabolic reflecting surface and having a second outer surface opposite to said first surface and realizing said planar surface with said code pattern applied to said second outer surface.

\* \* \* \* \*